J. STEPHENSON.

Street-Car.

No. 6,697.

Reissued Oct. 11, 1875.

Witnesses.

L. Van Riswick

D. G. Stuart

Inventor.

John Stephenson per D. Hannay atty.

UNITED STATES PATENT OFFICE.

JOHN STEPHENSON, OF NEW YORK, N. Y.

IMPROVEMENT IN STREET-CARS.

Specification forming part of Letters Patent No. 61,482, dated January 22, 1867; reissue No. 5,697, dated October 11, 1875; application filed July 23, 1875.

DIVISION E².

*To all whom it may concern:*

Be it known that I, JOHN STEPHENSON, of New York, in the county of New York and State of New York, have invented certain new and useful Improvements in Roofs for Railroad-Cars; and I do hereby declare that the following is a full, clear, and exact description thereof, that will enable others skilled in the art to which it appertains to make and use the same, reference being had to the accompanying drawings, which form a part of this specification.

This branch of my invention relates to new and useful improvements in the construction of street-cars, whereby a better system of ventilation is secured.

In cars, as previously constructed, but little provision was made for ventilation. As a necessary consequence, in certain conditions of the atmosphere, when the cars are crowded, the air not only becomes impure and unhealthy, but absolutely offensive. This is more especially true with respect to passengers who are obliged to stand inside the car, as this foul and impure air collects around their heads immediately above the line of the windows. These evils are intensified by the action of the sun's rays on the car-roof, which heat the tainted and poisoned air within, and thereby increase its virulency.

My improved construction aids largely in remedying these evils; and consists in raising or arching the roof sufficiently high to admit of the introduction of openings of considerable size in the ends of the car, between the under side of the roof and the door-head. It further consists in combining said end openings with an opening or openings arranged in the roof at or near the center of the car. By these means it is apparent that currents of air can always be made to traverse the upper part of the car either by the pressure of the outer atmosphere or by the forward movement of the car, and thus provide a pure atmosphere for the passengers.

To enable those skilled in the art to make, construct, and use my invention, I will now describe it in detail, omitting a description of such parts of a car as are unnecessary to a full understanding of the improvement.

Figure 1:
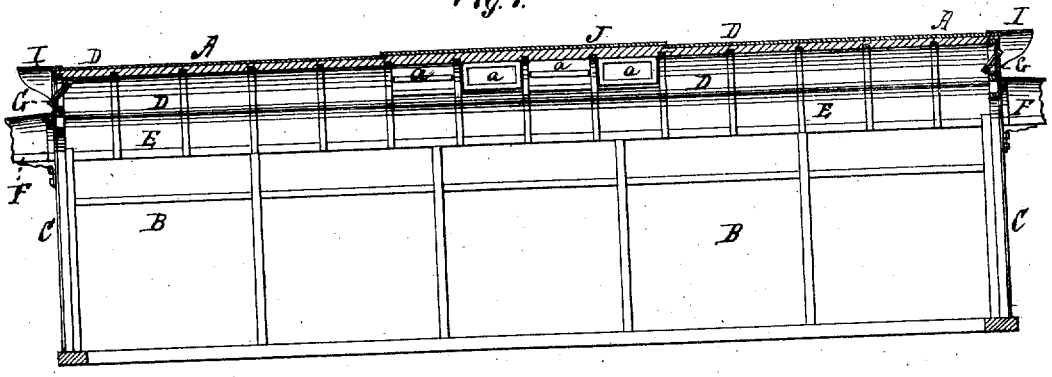
Figure 2:
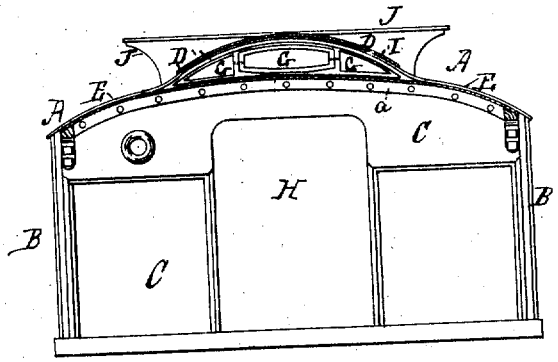

In the accompanying drawings, Figure 1 represents a vertical longitudinal section of the upper portion of a street-car, to which my improvements have been applied. Fig. 2 represents a vertical cross-section of the same, taken through the line *x x* of Fig. 1, looking toward the car body.

The car body may be made in any of the known forms. A suitable form for my purposes is represented in the drawings, in which A indicates the roof, B the upper portion of the sides, and C the corresponding portion of the ends of the car. The roof A is raised or arched from front to rear, throughout its central or middle portion D, above the plane of the curved portions E of its outer sides, as shown in Fig. 2. To this raised form of the roof the ends C of the car are made to conform. By this construction space is afforded for the arrangement and formation in the ends C of the car of an opening or openings, G, of convenient size and shape, between the arched portion D of the roof A and the upper end of the doorway H. These openings G are usually provided with a glass sash balanced on pivots, so as to be easily opened and shut. They also serve to admit light during the day, and when covered with colored glass act as a signal at night. Their main object, however, is to ventilate the car. Immediately below openings G, between them and the doorway, is arranged a canopy, F, for the protection of the platform below. The canopy thus arranged is only used in connection with a roof, A, made of the same length as the car body.

When the car is thus constructed a small hood or frontlet, I, is provided at each end, at that portion of the roof immediately over the openings, in order to protect them from the weather, and to exclude the direct rays of the sun. In addition to the end-ventilating openings G, it is desirable to use in connection with them another opening or openings at or near the central portion of the roof. For this purpose a short section of the roof is elevated slightly at the ridge, so as to form a dome, J. In practice, about an inch at the center and about ten at the eaves of the dome is found sufficient. The side walls of this dome are provided with hinged or pivoted glass sashes or panels *a*, which, on being adjusted, will remain open or closed, as required. These sashes or panels, when open, permit currents of air to pass freely through the upper part of the car from side to side, according to the direction of the wind, thereby carrying off the impure air, so that when used in connection with the end opening G in the ends of the car free ventilation will always be insured, and a pure atmosphere obtained.

Having described my invention, what I claim as new, and desire to secure by Letters Patent, is—

1. A street-car constructed with an arched roof at or near its central part D, and with correspondingly-shaped ends to admit of openings G being formed in the latter, in the manner substantially as and for the purposes set forth.

2. A street-car provided with a frontlet, I, and a canopy, F, arranged in a plane below the general plane of the roof, and with an opening or openings, G, between the two, substantially as set forth.

3. The combination of a car body, provided with an opening or openings, G, in its end or ends, with an elevated dome, J, provided with an opening or openings, *a*, substantially as set forth.

In testimony that I claim the foregoing I have hereunto set my hand this 2d day of July, 1875.

JOHN STEPHENSON.

Witnesses:
STUART A. STEPHENSON,
WM. J. WALKER.